US009349037B2

(12) United States Patent
Cséfalvay et al.

(10) Patent No.: US 9,349,037 B2
(45) Date of Patent: May 24, 2016

(54) SKIN COLOUR PROBABILITY MAP

(71) Applicant: Imagination Technologies Limited, Kings Langley (GB)

(72) Inventors: Szabolcs Cséfalvay, Hemel Hempstead (GB); Paul Brasnett, West Molesey (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 14/522,009

(22) Filed: Oct. 23, 2014

(65) Prior Publication Data

US 2015/0110352 A1 Apr. 23, 2015

(30) Foreign Application Priority Data

Oct. 23, 2013 (GB) .................................... 1318757.0

(51) Int. Cl.
*G06K 9/00* (2006.01)
*G06T 7/00* (2006.01)

(52) U.S. Cl.
CPC ........ *G06K 9/00228* (2013.01); *G06K 9/00234* (2013.01); *G06T 7/0046* (2013.01);
(Continued)

(58) Field of Classification Search
None
See application file for complete search history.

(56) References Cited

U.S. PATENT DOCUMENTS

| 7,020,337 | B2 * | 3/2006 | Viola | ................. | G06K 9/00228 |
| | | | | | 382/118 |
| 7,031,499 | B2 * | 4/2006 | Viola | ................. | G06K 9/00268 |
| | | | | | 382/118 |

(Continued)

FOREIGN PATENT DOCUMENTS

| EP | 1353516 A1 | 10/2003 |
| WO | WO-99/23600 A1 | 5/1999 |
| WO | WO-99/35606 A1 | 7/1999 |

OTHER PUBLICATIONS

Rein-Lien Hsu; Abdel-Mottaleb, M.; Jain, A.K., "Face detection in color images," in Pattern Analysis and Machine Intelligence, IEEE Transactions on , vol. 24, No. 5, pp. 696-706, May 2002.*

(Continued)

*Primary Examiner* — Andrae S Allison
(74) *Attorney, Agent, or Firm* — Vorys, Sater, Seymour and Pease LLP; Vincent M DeLuca

(57) ABSTRACT

A data processing system for performing face detection on a stream of frames of image data, the data processing system comprising: a face detector configured to detect a first face candidate in a first frame by performing face detection within first search tiles defined for the first frame; a color measurement unit configured to calculate a set of color parameters including an average color of the first face candidate expressed according to a predefined color space; a transformation unit configured to: transform a second frame into the predefined color space, one of the axes of the color space being substantially oriented in the direction of maximum variation according to a predetermined distribution of skin color; and form a skin color probability map for the second frame by calculating the probability that a given color is a skin color from a measure of the color space distance of that color from the calculated average color; and a search tile generator configured to generate second search tiles based on the skin color probability map for use by the face detector, the second search tiles defining areas of the second frame within which the face detector is to perform face detection so as to detect one or more second face candidates in the second frame.

14 Claims, 7 Drawing Sheets

(52) U.S. Cl.
CPC ..... *G06T7/0081* (2013.01); *G06T 2207/10016* (2013.01); *G06T 2207/10024* (2013.01); *G06T 2207/30201* (2013.01)

(56) References Cited

U.S. PATENT DOCUMENTS

| | | | | |
|---|---|---|---|---|
| 7,212,651 | B2* | 5/2007 | Viola | G06K 9/00369 382/103 |
| 2002/0076100 | A1* | 6/2002 | Luo | G06K 9/00228 382/164 |
| 2002/0102024 | A1* | 8/2002 | Jones | G06K 9/6256 382/225 |
| 2004/0017930 | A1 | 1/2004 | Kim et al. | |
| 2004/0037460 | A1* | 2/2004 | Luo | G06K 9/00228 382/165 |
| 2004/0151381 | A1* | 8/2004 | Porter | G06K 9/00228 382/218 |
| 2004/0258307 | A1* | 12/2004 | Viola | G06K 9/00369 382/190 |
| 2008/0019574 | A1* | 1/2008 | Scalise | G06K 9/00228 382/118 |
| 2008/0019575 | A1* | 1/2008 | Scalise | G06K 9/00234 382/118 |
| 2009/0263038 | A1* | 10/2009 | Luo | G06K 9/32 382/254 |
| 2010/0272363 | A1* | 10/2010 | Steinberg | G06K 9/00228 382/190 |

OTHER PUBLICATIONS

GB Application No. GB1407063.5 Search Report dated Oct. 17, 2014.
C. B. Do, "The Multivariate Gaussian Distribution," Oct. 10, 2008.
J. Friedman et al., "Additive logistic regression: a statistical view of boosting (With discussion and a rejoinder by the authors)," The annals of statistics, vol. 28, No. 2, pp. 337-407, 2000.
OpenCV, "Back Projection," OpenCV 2.4.9.0 Documentation (undated).
L. I. Smith, "A tutorial on Principal Components Analysis," pp. 1-26, Feb. 26, 2002.
P. Viola & M. Jones, "Robust Real-Time Face Detection," International Journal of Computer Vision, vol. 57, No. 2, pp. 137-154, Jan. 10, 2004.
Wikipedia, "Halton Sequence," pp. 1-3, Mar. 13, 2013.

* cited by examiner

SKIN COLOUR PROBABILITY MAP

BACKGROUND OF THE INVENTION

This invention relates to data processing systems and methods for performing face detection in a series of frames.

Whilst humans might take for granted the ability to readily identify faces in a picture, it can be a difficult problem for computers to solve. A significant effort has been made over recent years to improve the accuracy and reliability of automatic face detection. However, even the most powerful systems still fall far short of the performance of the human brain, with the performance of portable devices having low power processors often being unable to detect faces in images under a wide range of lighting conditions and face orientations.

The drive to improve automatic face detection on digital devices stems from the fact that being able to reliably detect faces in images and videos is enormously useful. For example, knowing the location of faces in an image allows manual or automatic tagging of images with the names of the people to whom the faces belong. And since the human brain is particularly sensitive to faces, knowing the location of faces in a video stream allows a video encoder to improve the perceived quality of an encoded video stream by preferentially encoding the areas of the video frames containing faces at a higher quality. Furthermore, if face detection can be performed in real-time, the location of faces in a scene can be used by the autofocus systems of a camera to help ensure that those areas of the image are in focus.

Many modern methods for performing automatic face detection are based on the Viola-Jones object detection framework which breaks down face detection in a digital image into a series of processing steps, each of which is fast to perform at a digital processor. The Viola-Jones framework operates by applying binary classifiers to subwindows of an image, each subwindow being at a different location, scale or angle of rotation within the image so as to allow faces at different locations, or of different sizes and angles of rotation to be detected. Each binary classifier performed on a subwindow of an image is made up of a cascaded set of strong classifiers of increasing complexity that are operated on the subwindow so as to detect whether the subwindow is likely to bound a face in the image. Only if all of the strong classifiers pass a subwindow is that subwindow passed as (potentially subject to further processing) representing a match for the binary classifier. If any of the strong classifiers reject the subwindow then no further processing is performed on that subwindow and processing moves onto the next subwindow. Further details of face detection performed according to the Viola-Jones framework can be found in the paper by P. Viola and M. Jones: "Robust real-time face detection", International Journal of Computer Vision, vol. 57, no. 2, pp. 137-154, 2004.

The classifier operations performed according to the Viola-Jones object detection framework can be performed quickly at a digital processor and even in portable devices allow a basic level of real-time face detection to be performed. However, because the potential search space for an image is very large it is difficult to reliably detect all of the faces of an image in real-time using the Viola-Jones framework. The search space of an image may include subwindows having every possible combination of location, size and rotation in the image. In order to permit real-time detection of faces, the search space is typically narrowed significantly by ignoring the possible rotations of subwindows in the image, or only looking at a narrow range of rotated subwindows. This means that only those faces that are at least substantially upright in the image are likely to be found.

There is therefore a need for improved apparatus for performing face detection that allows accurate and reliable real-time face detection at a portable device and permits the identification of faces that are not presented upright in the image.

SUMMARY OF THE INVENTION

According to a first aspect of the present invention there is provided a data processing system for performing face detection on a stream of frames, the data processing system comprising:

a face detector configured to detect a first face candidate in a first frame by performing face detection within first search tiles defined for the first frame;

a colour measurement unit configured to calculate a set of colour parameters including an average colour of the first face candidate expressed according to a predefined colour space;

a transformation unit configured to:
transform a second frame into the predefined colour space, one of the axes of the colour space being substantially oriented in the direction of maximum variation according to a predetermined distribution of skin colour; and form a skin colour probability map for the second frame by calculating the probability that a given colour is a skin colour from a measure of the colour space distance of that colour from the calculated average colour; and a search tile generator configured to generate second search tiles based on the skin colour probability map for use by the face detector, the second search tiles defining areas of the second frame within which the face detector is to perform face detection so as to detect one or more second face candidates in the second frame.

The second frame may be subsequent to the first frame in the stream of frames.

The colour measurement unit may be further configured to calculate as colour parameters degrees of variation of colours in the first face candidate along the coordinate axes of the predefined colour space, and the transformation unit is configured to calculate the probability that a given colour is a skin colour from the measure of the colour space distance of that colour from the calculated average colour scaled by the calculated degrees of variation of colours.

The colour measurement unit may be configured to calculate the average colour and degrees of variation of colours of the first face candidate from only a central portion of the first face candidate.

Coordinate axes of the predefined colour space may be determined by means of a principal component analysis of the predetermined distribution of skin colour.

The set of colour parameters for the first face candidate may represent an ellipsoid in the predefined colour space, the ellipsoid being centred on the average colour and having axes oriented parallel to the coordinate axes of the predefined colour space with lengths defined by the respective degree of variation in colours.

The face detector may be configured to detect faces in the first frame by applying binary classifiers to subwindows of the first search tiles, and to group together sets of overlapping subwindows detected as faces in the first frame so as to form a single face candidate for each set, each face candidate being allocated a weight according to the number of overlapping subwindows in its set and the first face candidate being the face candidate with the highest weight.

The transformation unit may be configured to maintain a plurality of sets of colour parameters calculated for a plurality of face candidates from one or more frames prior to the second frame in the stream, each set of colour parameters inheriting the weight allocated to the respective face candidate and the set of colour parameters used by the transformation unit being the set of colour parameters with the highest weight.

The colour measurement unit may be operable to calculate a new set of colour parameters for a new face candidate, the transformation unit being configured to, if an ellipsoid for the new set overlaps an ellipsoid represented by a currently stored set of colour parameters by more than a predetermined degree, update the existing set of colour parameters by replacing the existing set of colour parameters with the new set of colour parameters and forming a new weight by combining the weights of the existing and new set of colour parameters.

The face detector and transformation unit may be supported at a GPU.

The colour measurement unit and search tile generator may be supported at a CPU.

The first and second frame may both represent a single image, the first and second frames optionally being identical.

According to a second aspect of the present invention there is provided a method of performing face detection on a stream of frames using a data processing system, the method comprising:
  detecting a first face candidate in a first frame of the stream by performing face detection within first search tiles defined for the first frame;
  calculating a set of colour parameters including an average colour of the first face candidate expressed according to a predefined colour space;
  transforming a second frame of the stream into the predefined colour space, one of the axes of the colour space being substantially oriented in the direction of maximum variation according to a predetermined distribution of skin colour;
  forming a skin colour probability map for the second frame by calculating the probability that a given colour is a skin colour from a measure of the colour space distance of that colour from the calculated average colour;
  generating second search tiles based on the skin colour probability map; and
  detecting one or more second face candidates in the second frame by performing face detection within the second search tiles.

According to a third aspect of the present invention there is provided a machine readable storage medium having encoded thereon non-transitory machine readable code for generating the data processing system.

There is provided a data processing system for performing face detection on a stream of frames, the data processing system comprising:
  a skin patch identifier configured to identify one or more patches of skin colour in a first frame and characterise each patch in the first frame using a respective patch construct of a predefined shape;
  a first search tile generator configured to generate one or more first search tiles from the one or more patch constructs; and
  a face detector configured to detect faces in the stream by performing face detection in one or more frames of the stream within the first search tiles.

The face detector may be configured to perform face detection only within areas of a frame represented by search tiles, the search tiles including the first search tiles.

The first search tile generator may be configured to generate the one or more first search tiles each having an orientation determined from the orientation of the respective patch construct.

The face detector may be configured to detect faces in the stream by performing face detection in the first frame within the first search tiles.

The face detector may be configured to perform face detection by applying binary classifiers to one or more subwindows of the first search tiles.

The face detector may be configured to perform face detection only in those subwindows of the first search tiles that are not rotated relative to the orientation of the respective search tile.

The skin patch identifier may be configured to form each patch construct so as to characterise the location, size and orientation of the respective patch of skin colour identified in the first frame.

The predefined shape may be an ellipse and the orientation of each of the one or more patch constructs is indicated by the orientation of the ellipse.

The first search tile generator may be configured to generate for each patch construct a plurality of first search tiles having a predefined set of sizes relative to the size of that patch construct.

The data processing system may further comprise a transformation unit configured to generate from the first frame image data representing achromatic information in the frame at a plurality of scales, the face detector being configured to perform face detection from that image data.

The data processing system may further comprise a transformation unit configured to generate from the first frame a skin colour probability map indicating for each pixel in the first frame a probability that the pixel represents a skin colour, the skin patch identifier being configured to detect the one or more patches of skin colour in the first frame from the skin colour probability map.

The skin patch identifier may be configured to perform thresholding of the skin colour probability map so as to operate on binary values indicating, for each pixel in the skin colour probability map, a high or low probability that the pixel represents a skin colour, the one or more patches of skin colour in the first frame being identified from the skin colour probability map by identifying patches of high probability values in the thresholded skin colour probability map.

The skin patch identifier may be configured to perform thresholding of the skin colour probability map using a threshold value selected from one of:
  a threshold value determined by reading a predetermined number of values from the probability map, sorting them into value order and calculating an average of those two neighbouring values having the greatest difference; and
  a random value selected from a predefined interval.

The transformation unit may be configured to convert the first frame into a skin colour probability map by:
  transforming the first frame into a predefined colour space, one of the axes of the colour space being substantially oriented in the direction of maximum variation according to a predetermined distribution of skin colour; and
  calculating the probability that a given colour is a skin colour from a measure of the colour space distance of that colour from an average skin colour.

The average skin colour may be determined from a measure of the average colour of at least some of the pixels of a face detected by the face detector in a previous frame of the stream.

The face detector and transformation unit may be supported at a GPU, and the skin patch identifier and first search tile generator may be supported at a CPU.

The data processing system may further comprise a second search tile generator configured to generate second search tiles for use as search tiles by the face detector in order to detect faces in the first frame, the second search tile generator being arranged to generate second search tiles having locations and/or sizes determined on a random or pseudo-random basis.

The data processing system may further comprise a grouping unit configured to group together sets of overlapping subwindows detected as faces in the first frame by the face detector so as to form a single detected face for each set.

The data processing system may further comprise a third search tile generator configured to generate third search tiles for use as search tiles by the face detector in order to detect faces in the first frame, the third search tile generator being arranged to generate third search tiles from one or more faces detected by the face detector in a frame prior to the first frame in the stream.

The third search tile generator may be configured to generate a plurality of third search tiles for each detected face formed by the grouping unit in a frame prior to the first frame, the plurality of third search tiles overlapping the respective face and having:
- a predefined set of sizes relative to the size of the face; and/or
- a predefined set of orientations relative to the orientation of the face.

The skin patch identifier may be configured to form patch constructs for each of a plurality of patches of skin colour, but the first search tile generator is configured to generate first search tiles for only a predetermined number of the largest patch constructs.

The stream of frames may represent a single image.

There is provided a method of performing face detection on a stream of frames using a data processing system, the method comprising:
- identifying one or more patches of skin colour in a first frame of the stream;
- characterising each of the one or more patches in the first frame using a respective patch construct of a predefined shape;
- generating one or more first search tiles for the first frame from the one or more patch constructs in the first frame; and
- performing face detection in one or more frames of the stream within the first search tiles so as to detect faces in the stream.

There is provided a machine readable storage medium having encoded thereon non-transitory machine readable code for generating the data processing system.

The present invention relates to face detection in image data. The image data could be, for example, a series of images, such as the frames of a video stream, or a single image.

BRIEF DESCRIPTION OF THE DRAWINGS

The present invention will now be described by way of example with reference to the accompanying drawings, in which.

DETAILED DESCRIPTION OF THE INVENTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
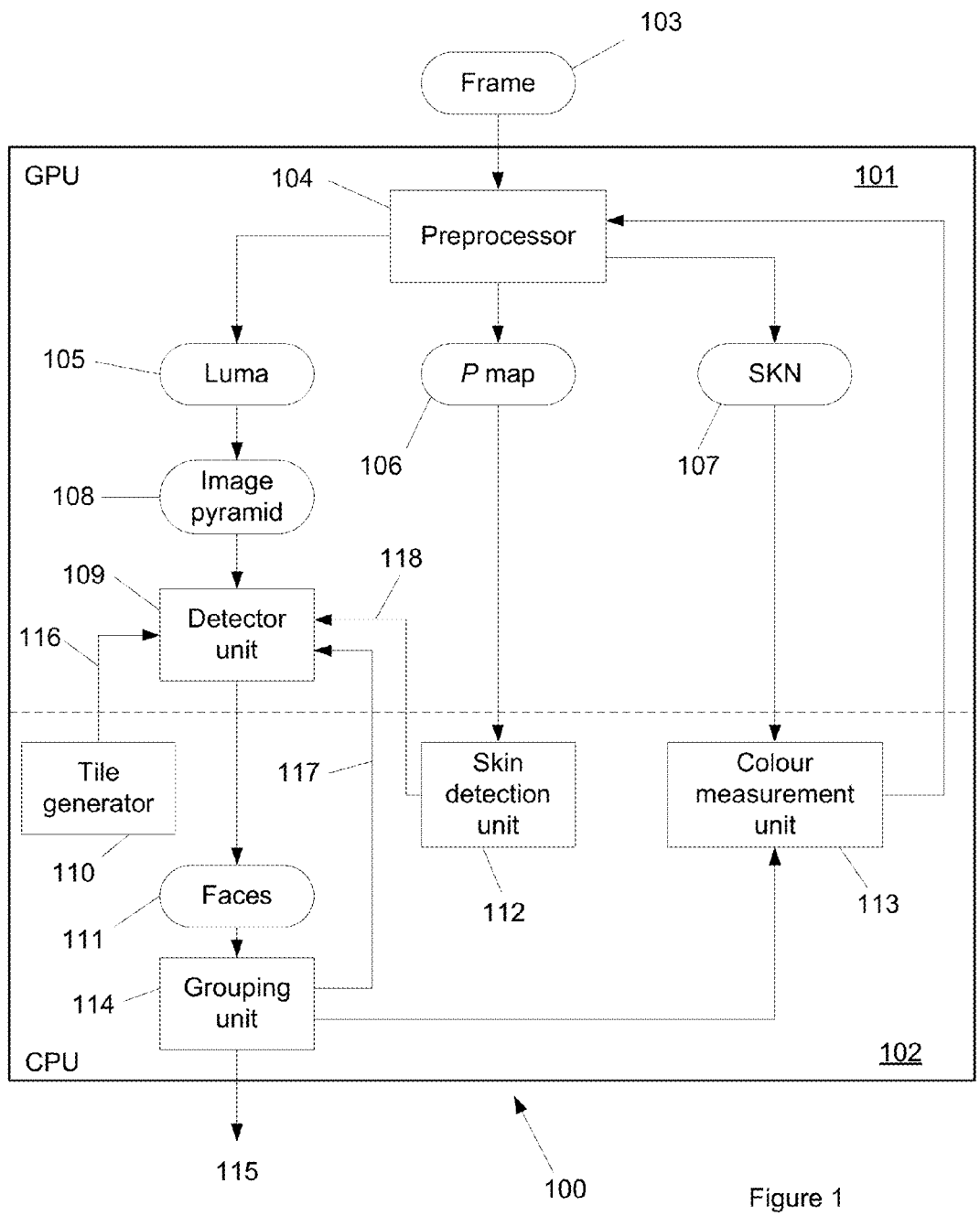
FIG. 1 is a schematic diagram illustrating the processing performed by a face detection system configured in accordance with the present invention.

FIG. 1 is a schematic diagram illustrating the processing performed by a face detection system configured in accordance with the present invention. Face detection system 100 receives a stream of source frames 103 in respect of which face detection is to be performed. The face detection system operates on each received source frame in turn to identify the faces in each frame and provide at its output the coordinates of a set of detected faces 115. In accordance with the teaching set out herein, the face detection system demonstrates improved performance and efficiency over prior art systems by making use of information acquired from previous frames when performing face detection on a current frame. This builds on the fact that at least some of the time, successive frames in a stream are likely to be related to one another and can therefore provide useful information as to the likely location of faces and the particular characteristics of skin colour in the current frame.

The source frames could be received from a camera or a recorded source, such as a set of stored photos or a video stream. The face detection system need not operate on consecutive frames in a stream and might be configured to operate only on every nth frame (say, every second or third frame). This could depend on the characteristics of the face detection system, for example how long it takes the system to perform its face detection operations. On completing face detection in a given frame, the face detection system could simply receive and start processing the most recently received frame.

In preferred embodiments, the face detection system receives the frames 103 from a camera sensor. For example, as a user composes a shot, the camera sensor captures video frames and provides them to the image processing pipeline of the camera (i.e. the "camera pipeline"). These frames are used (possibly in processed form) by the camera pipeline to perform functions such as autofocus and white balance correction, and are provided to the user as video on a display screen so as to allow the user to see what the camera sensor is capturing. Face detection system 100 might be provided as part of the camera pipeline.

The source frames 103 provided to the face detection system 100 would typically be RGB images, but any other suitable colour encoding could be used (e.g. YCbCr).

Face detection system 100 comprises a detector unit 109 which is configured to determine whether a given region of a frame is likely to contain a face. As is known in the art, this can be efficiently achieved through the use of binary classifiers such as those proposed by the Viola-Jones object detection framework. Detector unit 109 could be configured to operate directly on a received frame 103, but in order to reduce the resource requirements of the detector unit, the binary classifiers are preferably performed on a downscaled, image pyramid 108, as shown in FIG. 1. The generation of such an image pyramid will now be described.

Preprocessor 104 is configured to convert received frames 103 into single channel images 105. With binary classifier face detection systems, it is generally the achromatic information in an image that is important; colour information is less important and can be discarded for the purposes of face detection so as to reduce the image size and hence the processing resources required. In the example of FIG. 1, the single channel image 105 is the luma, or brightness, component of the frame. Other representations of the frame could also be used. For example, if converted into the SKN colour space described below, the S channel (e.g. that channel whose axis is substantially oriented in the direction of maximum variation of an empirically-determined distribution of skin colour) can be used as single channel image 105. Preprocessor 104 could additionally process frames 103 in other ways so as to emphasize the features associated with faces in luma images 105 and/or reduce the possible search space of the received frames. For example, a resolution of 640×480 pixels has been found to be sufficiently high to identify faces down to a reasonable size in an image and therefore, depending on the resolution of frame 103, it can be preferable to downscale the received frame.

In order to avoid aliasing problems, it is further advantageous if the preprocessor 104 is configured to form an image pyramid 108 comprising multiple representations of luma image 105 at different resolutions. Techniques for forming image pyramids are well known in the art. For a 640×480 pixel image, an image pyramid having six levels has been shown to provide good performance, with the resolution at each level being a factor of two smaller than the level above (e.g. the image pyramid would comprise luma images of sizes $\frac{1}{1}$, $\frac{1}{2}$, $\frac{1}{4}$, $\frac{1}{8}$, $\frac{1}{16}$, $\frac{1}{32}$ with respect to the size of the luma image 105). Scaling factors other than two may be used, but a scaling factor of two is convenient since it matches the scaling factors commonly used in computer graphics, where an image pyramid is also known as a mipmap. Lookups of pixel data from the image pyramid may then be accelerated using a GPU's mipmap hardware, should the system be implemented using a GPU.

Figure 2:
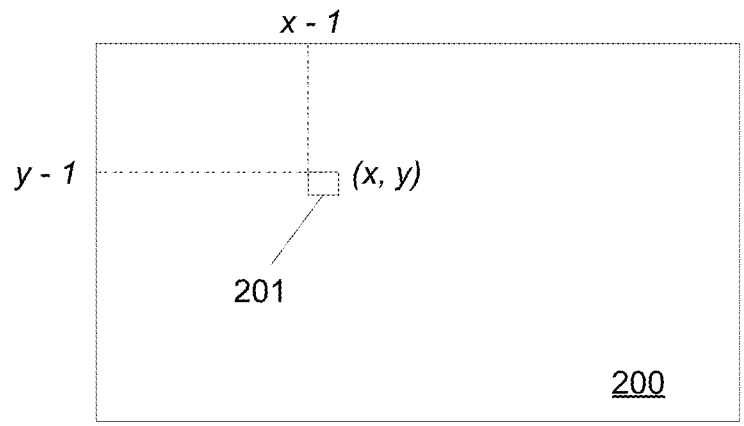
FIG. 2 is an illustration of the calculation of an integral image.

Depending on the choice of binary classifier and the nature of the calculations performed by the detector unit, it can be preferable for the detector unit to operate on an integral image 200 of the image pyramid in which a given pixel value 201 at coordinate (x, y) is the sum of the pixel values in the rectangle defined by the corners (0,0) and (x−1, y−1) as illustrated in FIG. 2. These integral images would be calculated in their entirety by the detector unit prior to it performing any face detection calculations. However, because detector unit 109 is preferably configured to detect faces that may be rotated in-plane, it would be preferable that the integral images are calculated on the fly so as to avoid the detector unit 109 having to perform a substantial amount of unnecessary processing in generating images for each possible rotation.

Under the Viola-Jones framework, each binary classifier comprises a cascaded set of strong classifiers of increasing complexity. In order to determine whether a given subwindow of an image contains a face, the strong classifiers are applied in order such that if all of the strong classifiers in the cascade find a match, the subwindow is classified as a face. In the present case, the subwindows are subwindows of the appropriate luma image pyramid 108. If at any stage of the cascade a match is not found, the subwindow is classified as not being a face and evaluation of the binary classifier is aborted for that subwindow. The face detection system is described herein with the Viola-Jones framework in mind, but variants and other types of face detection algorithms are also envisaged to benefit from the advantages of the invention.

In order to ensure that all of the faces in an image are found by exhaustive search using the binary classifier approach, it would be necessary to apply the binary classifiers to all of the possible subwindows of an image. This is because a face in the image could be at any location and of any size and the possible subwindows must therefore include subwindows of all possible sizes and at all possible locations in the image. If faces that are not "upright" in the image are also going to be detected, all possible rotations of all of the subwindows must also be searched. This is a very large search space and impractical to be performed in real time in a camera pipeline, especially in the case of a portable device in which power consumption is a key concern.

Examples described herein provide mechanisms for intelligently providing to the detector unit 109 a list of search tiles in which face detection is to be performed, a search tile bounding areas of frames within which face detection is to be performed. The detector unit preferably only searches for faces in the search tiles identified to it and not in areas outside search tiles.

Figure 7:
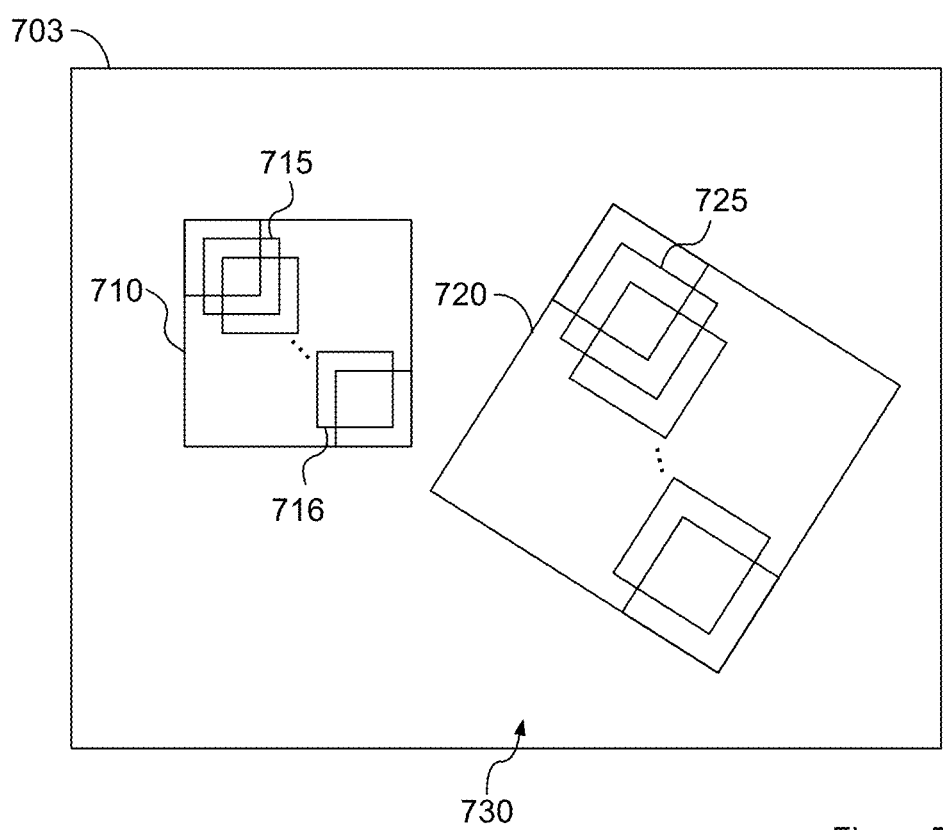
FIG. 7 illustrates an exemplary relationship between search tiles and subwindows.

FIG. 7 shows the relationship between search tiles and subwindows in an example implementation. A frame 703 contains search tiles 710 and 720 which are determined using methods discussed below. Within each search tile, the search for a face may be exhaustive, that is, each possible subwindow within the tile may be tested using the detector unit 109. Search tile 710 contains subwindows such as 715 and 716, and search tile 720 contains subwindows such as 725. For clarity, not all subwindow positions are shown. The space 730 is outside the search tiles, and is not searched. To reduce the search space within each search tile, the subwindows vary only by position. The angle of rotation and size of the subwindows do not vary within a search tile. Instead, the search tiles may be scaled and rotated. Subwindows rotate according to the rotation of the search tile, and the size of the subwindows remains in proportion to the search tile. In FIG. 7, search tile 710 is aligned to the frame axes and is relatively small. Search tile 720 is rotated, and is larger than search tile 710. Accordingly, subwindows of search tile 710 will test for small, upright faces, and subwindows of search tile 720 will test for larger, rotated faces.

In one example, data provided to the detector unit 109 is scaled, according to the size of the current search tile, by reading from the appropriate level or levels of the image pyramid. Similarly, the integral image from which the binary classifier operates is computed according to the rotation of the current search tile. The search tile is therefore normalized such that the detector unit 109 may search for faces using a binary classifier trained to recognise upright faces of the size of the normalized subwindow. In one example the normalized search tile is 40×40 pixels and the normalized subwindow is 24×24 pixels. In other examples the sizes of the normalized search tile and subwindow at the detector unit may vary.

Thus, and as will be described further, defining search tiles significantly reduces the search space, allows the resources of the face detection system to be focussed on those areas of an image which are most likely to contain a face, and further allows faces of varying rotations to be detected in real time in the image. Furthermore, in preferred embodiments, the face detection system iterates over multiple frames, making use of information determined in relation to previous frames on the assumption that the frame has not changed significantly. This assumption is generally a good assumption for video frames, in particular for the video frames provided by a camera sensor when the user of the camera is composing a shot.

In the case that a Viola-Jones type framework is used, the detector unit 109 is configured to search a substantial number and preferably all of the possible subwindows within a given identified search tile (those subwindows not being rotated relative to the orientation of the search tile, e.g. as shown in FIG. 7).

In the face detection system 100, the search tiles in which face detection is to be performed are provided to detector unit 109 from three sources: from tile generator 110, from a set of search tiles generated from face candidates identified in a previous frame 117, and from a skin detection unit 112. The generation of search tile lists at these three sources will now be described. Further search tiles and/or areas of the source frame that are not to be searched could be provided to the detector unit from additional sources, which could be external to face detection system 100. For example, a camera pipeline might determine that certain areas of the source frame are unlikely to or do not contain faces and therefore should not be searched; this information could be provided to the detector unit so as to reduce the search space for the detector unit.

Note that in the example system shown in FIG. 1 the detector unit performs face detection in search tiles defined for luma image pyramid 108. However, since the luma image pyramid represents source frame 103 the following paragraphs interchangeably and equivalently refer to image pyramid 108 and source frame 103.

Figure 3:
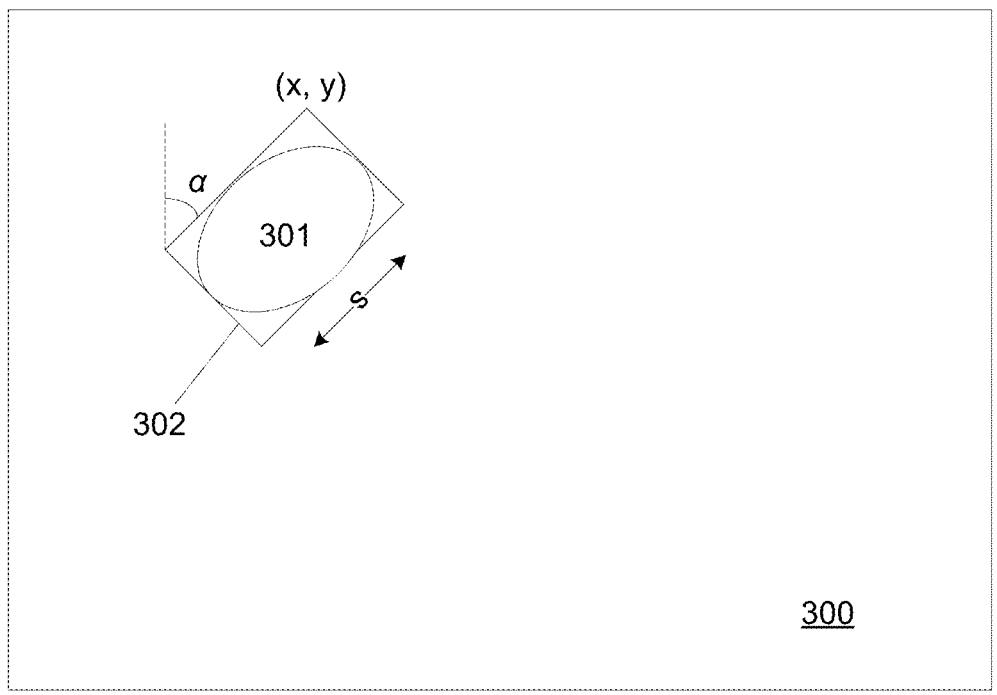
FIG. 3 is an illustration of an exemplary set of parameters identifying a detected face in a frame.

Detector unit 109 provides at its output a list of face candidates 111. Each face candidate could be expressed as a set of four coordinates: x and y coordinates describing the location of the face (typically the top-left corner of a box bounding the face candidate), a scale s that describes the size of the face, and an angle a that describes an angle of rotation of the face. An exemplary relationship between these parameters and a face candidate 301 is illustrated in FIG. 3 for a frame 300. Scale s may be defined in any convenient way, for example, it may represent the height, or the area of the detected face. Since the detector unit 104 will often identify the same face more than once in overlapping search tiles or in several subwindows inside the same search tile, a grouping unit 114 is provided to process the list of face candidates 111 and group overlapping face candidates so as to form a single set of coordinates for each detected face. At any given time, the list of detected faces at the output of grouping unit 114 represents the working set of detected faces for use by other functionalities of the face detection system.

Grouping unit 114 can be configured to group face candidates using any suitable algorithm. In one example it may be sufficient to group all candidates which have any degree of overlap with one another into a single detected face. In other examples, the algorithm may consider the number of overlapping candidates at different positions in an attempt to distinguish between several faces in close proximity. Having determined a group of candidates, the grouping unit can then determine a set of coordinates for the detected face. One way of doing this may be to form an average of the group's (x, y, s, α) coordinates (e.g. calculating the mean of each of the x, y, s and α coordinates of the set of overlapping detections).

The first source of search tiles 116 is provided by tile generator 110, which is configured to generate search tiles of luma image pyramid 108 at least partly on a random or pseudo-random basis (the term "random" shall be understood to include "pseudo-random"). For example, the tile generator 110 might be configured to randomly select locations and sizes of search tiles. There could be non-random aspects to the selection performed by the tile generator 110. For example, the tile generator 110 might be configured to randomly select locations for each search tile in a predefined distribution of search tile sizes, or the tile generator 110 might be configured to randomly select locations and sizes of a certain number of search tiles within each of a set of predefined zones of the source frame. Most preferably, Halton sequences are used by the tile generator 110 to generate the locations of search tiles and ensure that the generated search tiles are evenly distributed, both over the search space of the frame, and in time, over several input frames.

Faces could occur anywhere in a frame, with the x, y locations of search tiles generated by the tile generator 110 preferably being selected from a uniform distribution. Since faces generally occupy only a small proportion of a frame, the scale s of search tiles generated by the tile generator is preferably generated from a distribution favouring smaller scales. This is because the density of the search required increases as the scale decreases. It may be convenient to define the scale s of a search tile according to the size of one of the search tile's subwindows (e.g. the largest subwindow). In this way, the same scale value s may be used to represent the size of the search tile, and the sizes of the face candidates 111 produced at the output of detector unit 109. The tile generator could be configured to generate search tiles having locations and sizes selected in accordance with the above teaching until a predefined number of search tiles M are generated.

Tile generator 110 is an independent source of search tiles in the sense that its output does not depend on where face candidates have been found in previous source frames. This ensures that the face detection system continues to receive fresh search tiles in which to perform face detection even as face candidates are found and improved upon from previous frames. As a result, over a sequence of received frames, the face detection system performs a thorough search for face candidates in the image space of the source frame. Because of the manner in which search tiles from the other sources are generated, the search tiles generated by the tile generator 110 preferably all have the same orientation (i.e. search tiles having different rotations are not provided to the detector unit 109 by the tile generator 110).

Since the output of tile generator 110 does not depend on the content of the source frames 103, the tile generator 110 could generate search tiles for the detector at any point in time. For example, the tile generator 110 could generate and store parameters defining search tiles for future frames whenever there is capacity at the processor at which it is supported.

The second source of search tiles 117 is provided by grouping unit 114 and enables tracking of previously detected faces between frames. For every detected face in the previous frame identified by the grouping unit 114, a set of tracking search tiles 117 is generated in which the detector unit 109 is to perform face detection. The set of tracking search tiles allows tracking of one or more of translation, rotation and scaling of previously detected faces. Good performance has been observed with the following set of empirically determined tracking search tile parameters:

[x, y, s, α]
[x, y, s, α−0.15]
[x, y, s, α+0.15]
[x, y, 0.9s, α]
[x, y, 0.9s, α−0.15]
[x, y, 0.9s, α+0.15]
[x, y, 1.1s, α]
[x, y, 1.1s, α−0.15]
[x, y, 1.1s, α+0.15]

It can be advantageous to modify the tracking search parameters in dependence on external inputs to the face detection system. For example, gyroscopic and/or accelerometer data from devices collocated with the face detection system at a camera can be used to infer the motion of the camera and hence track the resulting movement of detected faces between source frames.

The use of tracking search tiles ensures that areas of a frame in which a face has previously been detected are explicitly searched and increases the likelihood that previously detected faces will continue to be detected in the source frames even if they are translated or rotated to some degree, or their scale changes. The above list does not explicitly account for possible translational movements of a face because, as is described above, the detector unit 109 is configured to search at least a substantial number of the possible subwindows within a search tile. Multiple adjacent locations are therefore naturally searched by the detector unit 109 within a given search tile. In variants of the face detection examples described herein in which the detector unit 109 does not search all adjacent subwindows within a tile, the tracking search tiles could include search tiles that represent predetermined translations of a previously detected face.

The grouping unit is preferably configured to form the set of second search tiles for the next frame as soon as detector unit 109 has completed its search within the current frame. Alternatively the grouping unit could be configured to begin to form the sets of second search tiles as and when the coordinates of detected faces are received from the detector unit.

The third source of search tiles 118 are provided to the detector unit 109 by skin detection unit 112 which identifies areas of the source frame 103 that, based on their colour, are likely to represent areas of skin and hence might represent good candidates in which to search for faces. The identification of areas of skin in preferred embodiments will now be described. In less preferred embodiments, areas of skin could be identified by other mechanisms, such as directly from the source frame or another intermediate image using a range of RGB values defined as being "skin colour".

An exemplary method for performing face detection on a stream of frames that includes frames 901 and 904 is outlined in the flowchart of FIG. 9, which will be referred to in the following paragraphs. In this example, frame 901 occurs before 904 in the stream and is used in the manner described below to provide colour parameters in order to improve face detection in frame 904. A different aspect of the general exemplary method for performing face detection that is described herein is set out in FIG. 8. The overlap between these outline methods will become apparent in the following paragraphs.

In order to detect areas of skin colour in the frame, a custom SKN colour space is defined in which skin colour can be advantageously described. Principal component analysis of the faces of a large number of people of various races has shown that the distributions of skin colour in colour space is similar for different skin colours. A common set of principal component axes can therefore be defined for all skin colours and used as the coordinate system of a new custom colour space. This can be achieved by forming a set of principal component axes for a large set of measurements of skin colour and using those principal component axes as the SKN axes. The measurements would preferably be from people of a variety of races. A coordinate transformation can then be defined to convert (say) RGB colours into the SKN coordinate system. Similar transformations can be performed for source frames having colour encodings other than RGB.

Preprocessor 104 is configured to convert frame 103 into the SKN colour space image 107 (905 in FIG. 9), preferably following downscaling of the frame to an appropriate size that balances the available processing power against the desire to identify faces even of small size in the frame. A suitable resolution for the SKN image has been found to be 160×120 pixels.

Figure 5:
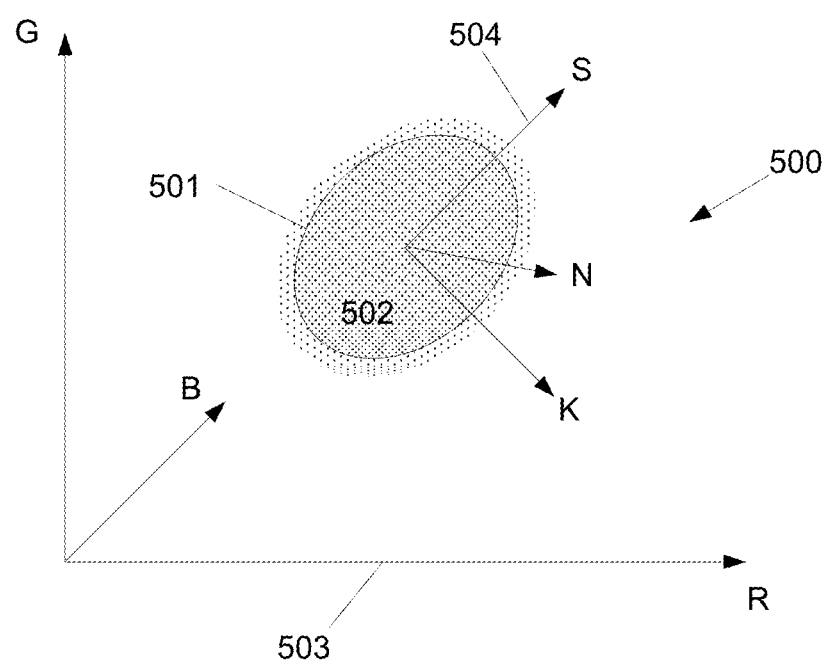
FIG. 5 is an illustration of a custom colour space for an expected distribution of skin colours.
Figure 9:
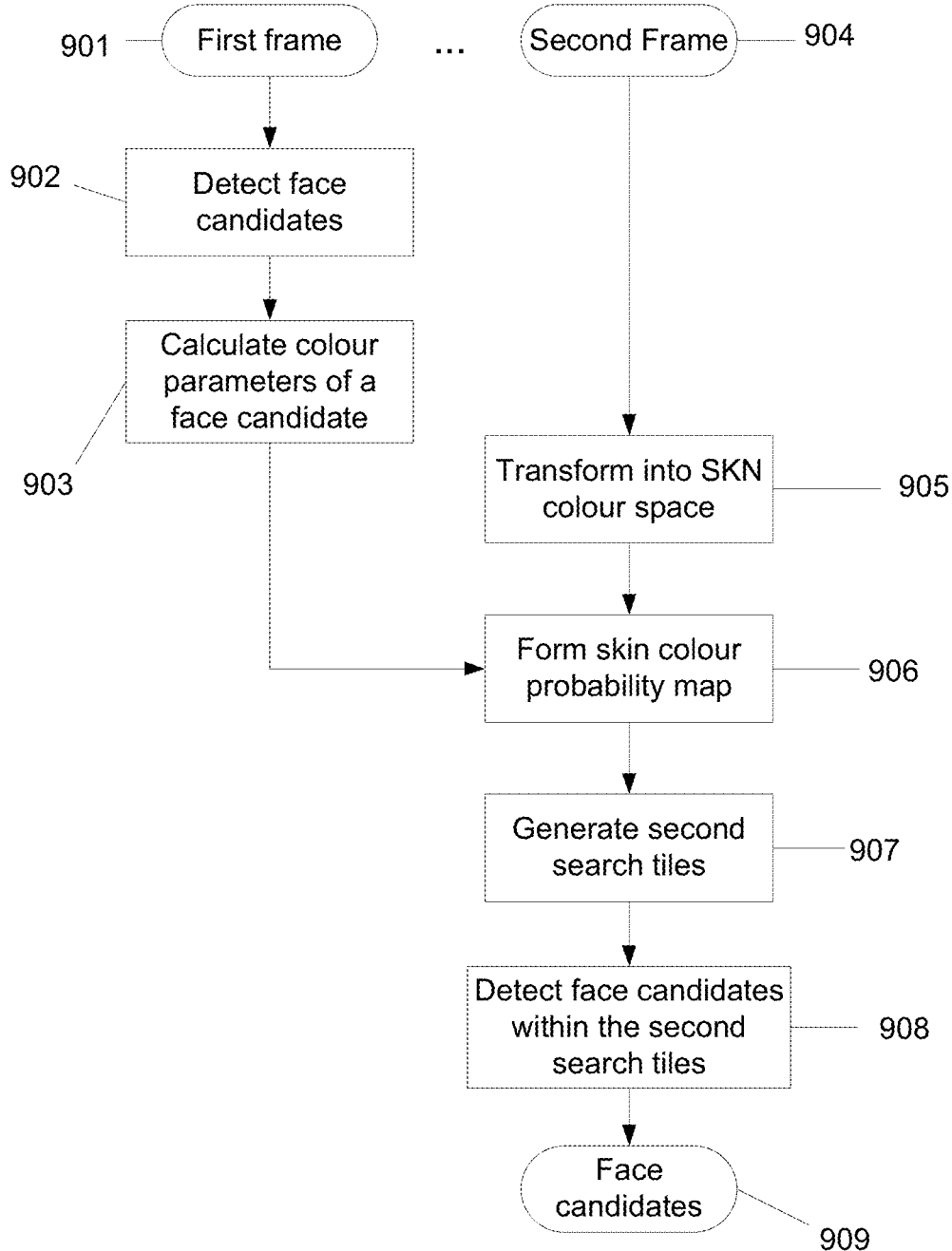
FIG. 9 is a flowchart of a method for performing face detection on a stream of frames in accordance with a still further aspect of the present invention.

The SKN image is used by colour measurement unit 113 to determine a "colour ellipsoid" for one or more faces detected in previous frames (e.g. in frame 901, with the face detection being performed at 902 in FIG. 9), the colour ellipsoid describing the distribution of skin colour of that face with reference to the SKN colour space. Such a colour ellipsoid 501 is illustrated in FIG. 5 and roughly bounds a typical distribution of skin colour points 502 in colour space 500. The colour ellipsoid is shown relative to a set of RGB coordinate axes 503 and SKN coordinate axes 504.

In order to calculate a colour ellipsoid, the colour measurement unit 113 measures the mean and the standard deviation of the S, K and N values of the pixels within a predefined area of the detected face rectangle expressing the location and size of the face (see FIG. 3; detected faces could alternatively be represented by means of other shapes). These six parameters define the colour ellipsoid, with the average S, K, N parameters defining the centre of the colour distribution of the detected face in colour space and the standard deviation in those parameters defining the size of the colour ellipsoid (i.e. the length of its axes) along the three coordinate axes of the SKN colour space. Other techniques for estimating the centre and spread of the distribution of skin colour of a detected face could equally be used. Shapes other than an ellipsoid could be used to describe the distribution of skin colour of a face (e.g. a cuboid) and yet utilise the same six parameters.

Figure 4:
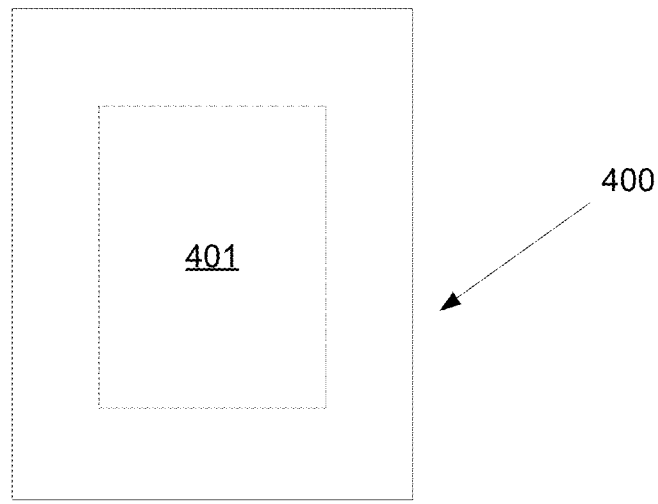
FIG. 4 is an illustration of an area of a detected face used to calculate an average skin colour.

As shown in FIG. 4, the predefined area of a detected face rectangle 400 is an area 401 centred within the detected face and having an area substantially less than that of the detected face rectangle so as to effectively sample the colour of the pixels in the central region of the face. Preferably the predefined area is 50% or less than the area of the detected face rectangle, and most preferably 25% or less.

The colour measurement unit 113 is configured to form a colour ellipsoid for one or more of the detected faces identified by grouping unit 114 in the output of detector unit 109. This can be done as soon as the detector unit has completed a frame and the detected faces are available at the grouping unit. Preferably a colour ellipsoid is formed by the colour measurement unit for those one or more detected faces that are most likely to actually be faces. The likelihood that a detected face corresponds to an actual face in the image can be assessed in many ways. Most preferably a weight is assigned to each of the detected faces identified at the grouping unit, each weight being a measure of the number of overlapping detections that were aggregated to form that face detection. For example, a detected face formed from five face candidates in list 111 would have a higher weighting than a detected face formed from just two face candidates. The weight assigned to a detected face is inherited by the corresponding colour ellipsoid. Other metrics could also contribute to the weight, such as the size of the detected face, its orientation, and/or its position in the frame.

Since the most likely face candidates may change over the course of a few frames, it is advantageous if the face detection system keeps track of more than one colour ellipsoid. Maintaining four colour ellipsoids has been found to provide good performance without requiring an excessive amount of resources. The parameters of the colour ellipsoids are preferably maintained at the preprocessor 104 along with their respective weights inherited from the corresponding detected face. As is discussed below, the preprocessor selects the appropriate colour ellipsoid based on the weight parameters, preferably by performing a selection from all of the colour ellipsoids biased toward higher weights). This ellipsoid represents the colour parameters calculated at 903 from a previous frame 901 in FIG. 9.

Often the colour ellipsoids generated from a stream of source frames will be very similar (this would typically be a consequence of the same faces being present in the video frames under the same lighting conditions). As a result, as new colour ellipsoids are calculated, the face detection system may find that new and existing colour ellipsoids substantially overlap. If a new ellipsoid overlaps the centre of an existing ellipsoid then preferably the weight of the new ellipsoid is increased by the weight of the existing ellipsoid and the parameters of the new ellipsoid overwrite the parameters of the existing ellipsoid. This helps the face detection system react to, for example, changing lighting conditions over a series of frames. If a new ellipsoid does not overlap any existing colour ellipsoids but its weight is higher than an existing ellipsoid and the maximum number of colour ellipsoids are already being maintained at the preprocessor, then the new ellipsoid replaces the existing ellipsoid having the lowest weight. This helps the system adapt to faces moving into and out of the frames, as well as to changing lighting conditions.

To make sure that the weights of the colour ellipsoids do not increase without limit, the weights maintained for each colour ellipsoid are decayed by multiplying the weight by a number less than one, e.g. 0.99, each time the colour measurement unit is invoked (e.g. once per frame). In this manner, the colour ellipsoid with the greatest weight will represent the colour distribution that has the highest confidence of being skin colour. Higher weights will generally indicate that the colour ellipsoid has been detected recently but relates to a detected face that has been present in the source frames for a relatively long period of time.

The use of skin colour ellipsoids defined with respect to a fixed set of SKN coordinate axes but which are adapted to the skin colour observed in a received frame through scaling and shift of the colour ellipsoid provides great flexibility to changing lighting conditions and skin colours without incurring the processing overhead associated with coordinate transformations. Furthermore, the colour space conversion (e.g. RGB to SKN coordinate transformation) and the calculation of colour ellipsoid parameters (i.e. the scale and shift operations) can be decoupled and performed where they can be done most efficiently. For example, it is preferable that the colour space conversion is performed at a GPU, since a GPU is typically highly optimised for performing coordinate transformations. The calculation of colour space parameters can be performed at a general purpose processor such as a CPU which is less optimised for performing coordinate transformations than the GPU.

In order to identify areas of skin colour in received frames it is necessary to define a mechanism by which a determination is made as to whether each pixel in a received frame (or its downscaled representation) is skin coloured. In preferred embodiments this is achieved by arranging that the preprocessor 104 calculate a skin probability map 106 using the SKN colour space and the highest weighted colour ellipsoid (alternatively an average—or better a weighted average—of one or more colour ellipsoids could be used). This is 906 in FIG. 9, which makes use of the colour parameters determined at 903. If no colour ellipsoid has yet been established because no face detections have yet been made, then the parameters of a default colour ellipsoid are used. In less preferred embodiments, areas of skin colour in received frames could be identified directly from an SKN image or from the original (possibly downscaled) frame itself.

Assuming that skin colour has a multivariate Gaussian distribution, then due to the advantageous choice of colour space the preprocessor 104 can form a map providing an indication of the probability p that each pixel in SKN image 107 is skin coloured by calculating the elliptic distance of the colour of each pixel, P, in the SKN colour space from the centre of the generated colour ellipsoid:

$$p = \sqrt{\left(\frac{P_s - C_s}{E_s}\right)^2 + \left(\frac{P_k - C_k}{E_k}\right)^2 + \left(\frac{P_n - C_n}{E_n}\right)^2}$$

where C represents the centre of the colour ellipsoid and $E_s$, $E_k$ and $E_n$ are the lengths of the semi-major axes of the colour ellipsoid. Under the definition of probability p above, high probabilities of a pixel being skin colour are values close to 0 whilst low probabilities of a pixel being skin colour are those close to 1 (values of p above 1 being clipped to 1).

The skin probability map 106 is calculated from the SKN pixel values of SKN image 107 but the skin probability map need not be generated using the SKN image itself. For example, the preprocessor 104 could be configured to concurrently form the SKN image and probability map. The probability map would typically, but not necessarily, have the same resolution as the SKN image.

Skin detection unit 112 is configured to identify areas of skin colour from the probability map by looking for areas of high probability (i.e. low values of p). This is preferably achieved by thresholding the skin probability map so as to form a binary identification of skin colour in a received frame. Various methods could be used to achieve a suitable threshold map. Two exemplary methods will now be described.

According to a first method, a threshold probability is selected for the probability map by reading a relatively small number of values from random locations in the map, sorting them, and finding the two adjacent values in the list with the greatest difference between them. In one example, the number of values read is 20. The average of these values is used as the threshold for the probability map. This first method is useful in cases when the area of skin in the image is relatively large and functions well even when the probability map is of poor quality (this might occur in the case of flawed measurements of skin colour from a previous frame). According to a second method, a threshold probability is selected at random from a predefined interval, for example between 0 and 0.5. This second method is useful when the probability map is good quality and works even if the area of skin in the image is small. The use of randomness in selecting a threshold is advantageous in giving the system an opportunity to find, by chance, a threshold which is otherwise difficult to determine. It is particularly advantageous if, for a given thresholding operation, one of the two above methods is selected at random and used to generate the threshold. By making use of both methods as the face detection system iterates over frames 103, the system benefits from the particular advantages of both methods.

An exemplary method for performing face detection on a source frame 801 is outlined in the flowchart of FIG. 8 and referred to in the following paragraphs.

The skin detection unit 112 is configured to identify potential face candidates in received frames by looking for at least substantially contiguous patches of high probability (i.e. above the determined probability threshold) in the binary threshold map. This is 802 in FIG. 8. Any suitable algorithm could be used to identify such patches in the threshold probability map data. A variety of suitable algorithms are known in the field of computer vision as "connected-component labelling", or "blob extracton". A typical two pass approach makes a first pass through the data assigning labels to data patches according to the connectivity that can be established during that pass. A second pass then merges patches where two or more labels are found to be equivalent. Other approaches, including a single pass approach, are also possible. A given patch might include one or more voids whilst still being a substantially contiguous patch of high probability (for example, where the eyes or moustache of a person might be located).

Having identified a patch indicative of skin colour, parameters indicative of the location and size of the patch are generated. In preferred embodiments, a bounding box is defined around a patch so as to identify the location and extent of the patch. Since such a bounding box acts as to group together those elements (e.g. pixels) of the threshold map that relate to a given patch, the bounding box could simply be axis aligned in the source frame—i.e. having sides orthogonal to the edges of the source frame.

Figure 6:
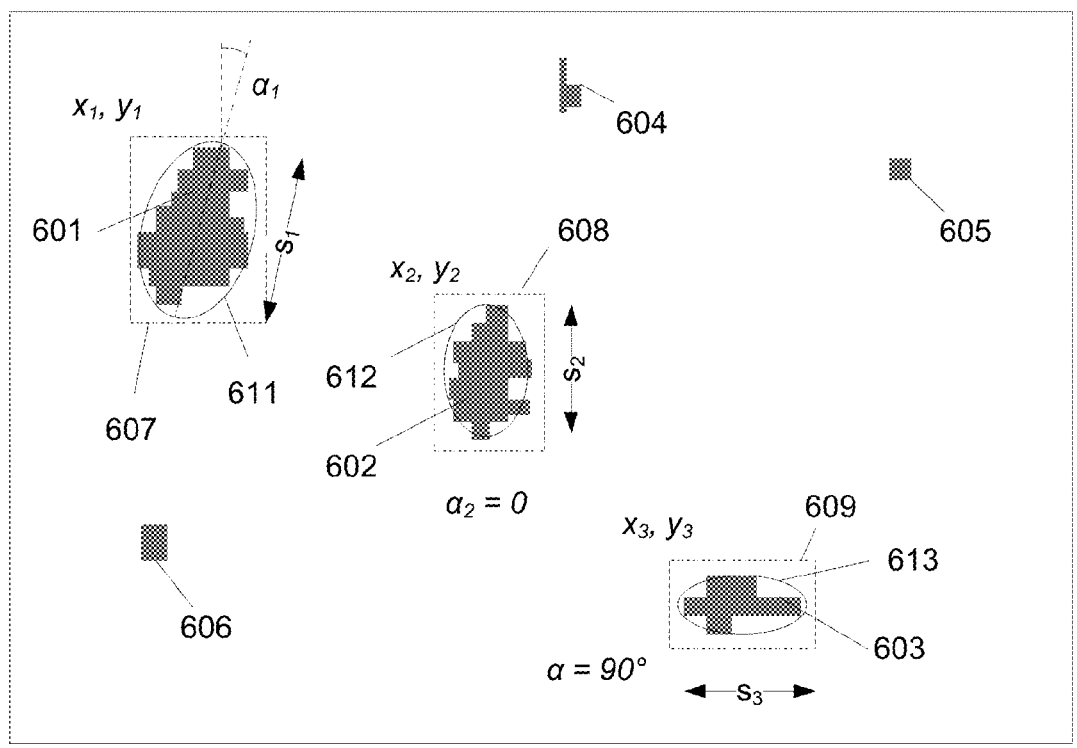
FIG. 6 is an illustration showing a set of skin colour patches identified in a threshold map.

The construction of bounding boxes around patches in the threshold map is illustrated in FIG. 6. There are several patches 601-605 of probability values above the calculated threshold in threshold map 600. In this example, only patches 601 and 602 actually relate to faces in the source frame, patch 603 is a hand and therefore is skin, whereas patches 604-606 are patches of colour within the skin colour range but which do not actually represent skin (false positives). The skin detection unit forms bounding boxes 607-609 around the three largest patches 601-603. In this example, patch 603 which is not actually a face therefore results in search tiles being generated, but it is unlikely that the detector unit will actually find faces in these search tiles.

A predefined shape—in the present example, an ellipse—is constructed for each of patches 601-603 by considering the threshold probability values inside each of the respective bounding boxes 607-609. This is 803 in FIG. 8. This predefined shape as fitted to a patch may be referred to as a "patch construct" herein. An ellipse can be fitted to a given patch by known image processing techniques, for example, calculation of various image moments of the binary threshold probability values inside the bounding box of the patch. The centre of each ellipse may be determined from the centroid of the patch, and the axes of the ellipse, giving its size and orientation, may also be determined from image moments of the patch.

Use of an ellipse is advantageous because it's shape is typically well-matched to the shape of a face and can therefore be used to provide reliably identify the orientation of a front-on face in an image. The orientation of each ellipse is essentially determined from the shape of the respective threshold patch. This is on the assumption that the major axis of an ellipse characterising a patch is likely to be approximately parallel to the line of symmetry of any face represented by that patch. In other words, faces are typically taller than they are wide and it is therefore a reasonable guess that the longest dimension of a threshold patch is roughly parallel to the line of symmetry of any face it represents. In the example shown in FIG. 6, the face represented by patch 601 is in fact tilted at a significant angle, which has been well estimated by angle $\alpha_1$.

Skin detection unit 112 identifies N (e.g. 5) patches from the threshold map that are to be used to generate search tiles for the detector unit 109. For example, the skin detection unit could sort the set of patches identified in a threshold map and select the N largest patches on the basis of their respective bounding box or ellipse parameters. In order to increase the likelihood of the detector unit finding any face present at the location indicated by a bounding box or ellipse, it is advantageous to arrange that the skin detection unit generate from each ellipse a set of search tiles having a range of scales and orientations. This is 804 in FIGS. 8 and 907 in FIG. 9. For example, for each of the N bounding boxes generated by the skin detection unit, the skin detection unit might generate the following six search tiles:

[x, y, 0.75s, $\alpha$]
[x, y, 0.6s, $\alpha$]
[x, y, 0.5s, $\alpha$]
[x, y, 0.75s, $\alpha+\pi$]
[x, y, 0.6s, $\alpha+\pi$]
[x, y, 0.5s, $\alpha+\pi$]

Parameters x, y, s, and $\alpha$ are determined from the position and orientation of the ellipse so as to define a set of search tiles that are each centred on the area of image corresponding to the respective patch of skin colour and are each of a size commensurate with the size of that respective patch. The parameters could be chosen so as to effectively define a bounding box for the ellipse which shares the orientation of the ellipse. A number of tiles may be generated with different scale parameters, in order to accommodate some inaccuracy in the size of the face predicted by the patch of skin colour. In one example, the scaling factor s is determined from the length of the major axis of the ellipse, which approximates the height of the face. In another example, which may provide greater robustness against the effect of lighting conditions on the shape of the patch, the scaling factor s is determined according to the area of the ellipse. The additional scaling factors, e.g. 0.75s, shown in the example above were determined empirically to match the size of the appropriate detector subwindows to the size of the skin colour patch.

Search tiles rotated by 180 degrees are provided to the detector unit because the orientation of patches identified by the skin detection unit have a 180 degree ambiguity.

The maximum number of patches N identified by the skin detection unit could be predefined but may also vary according to the available computation resources during operation of the face detection system. Where the number of patches is larger than N, the skin detection unit would preferably select the largest N patches. Alternatively, the skin detection unit could be configured to select from all available patches, with the probability of each patch being selected being determined according to the relative sizes of patches.

Figure 8:
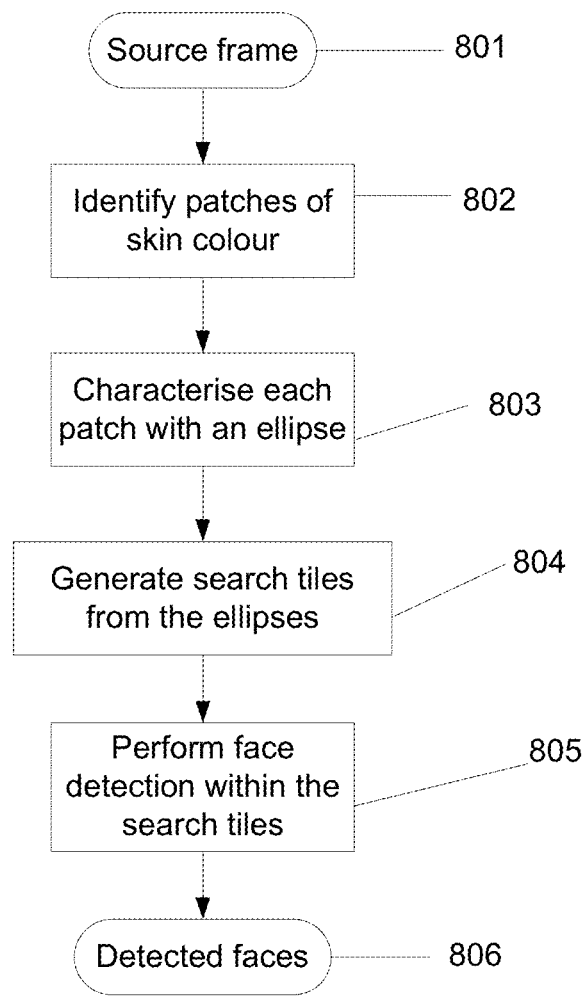
FIG. 8 is a flowchart of a method for performing face detection on a stream of frames in accordance with another aspect of the present invention.

At 805 in FIGS. 8 and 908 in FIG. 9, the detector unit performs face detection within the search tiles generated from the ellipses constructed for each patch so as to detect face candidates 806/909 in the stream of source frames.

Generating search tiles in this manner has several advantages. It intelligently directs the detector unit to search in areas of a frame that are most likely to include faces because they have a high probability of corresponding to patches of skin colour. This avoids having the detector unit perform exhaustive searches of the whole image space whilst affording the detector unit the resources to perform detailed searches within the search tiles identified to it. The skin detection unit also provides a source of search tiles of varying rotations as determined from the shape of patches in the threshold map. This significantly increases the efficiency and likelihood of the detector unit finding faces that are not upright in the source frame.

The detector unit 109 is therefore provided with search tiles generated on three different bases: randomly generated tiles 116 that inject fresh candidates into the detection pipeline and ensure that the image space is covered by searches in an unbiased fashion; tracking search tiles 117 that allow the detector unit to follow detected faces between frames if those faces rotate or change in size; and search tiles 118 from the skin detection unit 112 that identifies search tiles on the basis of skin colour in the received frame. The net effect of receiving tiles from these three different sources is to substantially improve the efficiency of face detection and allow low-power, realtime detection of faces in a stream of image frames, including faces that are not "upright" in the images.

Search tiles from the skin detection unit 112 are generated using a skin colour probability map generated from the current frame in which face detection is to be performed, with the colour ellipsoid used to generate the skin colour probability map being provided from previous frame(s). Less preferably, the skin detection unit 112 could generate search tiles from the current frame for use in the next frame.

Face detection systems configured in accordance with the present invention have several advantageous characteristics. Firstly, because the processing time of the detector unit is efficiently directed to those parts of the image that are most likely to yield faces, face detection can be performed in real time between frames. As a result, information as to the likely location of a face in a previous frame and colour information helpful in detecting new faces can be used to improve the accuracy of face detection in the next frame. Over the course of a few similar frames (e.g. frames acquired while a user composes a shot on a digital camera), the face detection system accurately locks onto and finds faces in the scene including faces that are rotated in the plane of the image.

Secondly, the system is flexible because at any point the current best estimates of faces by the detection system are available at its output (i.e. the set of face detections found in the previous frame).

Thirdly, the system is readily scaled in response to demands on any processing resources that the face detection system shares with other systems (e.g. other processing systems in the camera pipeline). In particular, the intensity of face detection processing can be adapted to the amount of available processing resources whilst maintaining realtime performance. For example, if the available processor cycles drop at a processor supporting the detector unit (e.g. in the case of a GPU it is required to perform other image processing), the number of search tiles provided to the detector unit can be reduced. Or if the available processor cycles drop at a processor supporting the skin detection unit, the number of search tiles generated by the skin detection unit can be scaled back (and potentially balanced by an increase in the number of search tiles generated by tile generator 110). Because the system builds on information gathered in previous frames, the system can make up for a lower amount of processing performed in respect of one frame over subsequent frames.

The face detection system uses information gathered from previous frames when processing a current frame. However, the system continues to work well even when the source image changes dramatically between frames (for example, if the user pans the camera away from a group of people to a blank wall). This is because the detector unit is configured to search the locations in a frame at which faces were found in the previous frame so as to confirm whether faces are still to be found at those locations: if there are now no faces in a given location in a frame, the detector unit is unlikely to find a match and those face candidates will no longer be provided at its output. The system therefore rapidly responds to significant changes in the position of faces in a stream of source frames. In the event that there are no detected faces in a frame, the colour measurement unit will not provide an estimate of skin colour for the next frame and the preprocessor will use a colour ellipsoid determined from measurements in past frames, or make use of a default colour ellipse.

A face detection system configured in accordance with the present invention is particularly suitable for being at least partially supported at a GPU (graphics processing unit). FIG. 1 illustrates a preferred distribution of the processing units of the face detection system between a GPU 101 and a CPU 102 (central processing unit). In this example, the pre-processor 104 and detector 109 are supported at the GPU 101 since its parallel architecture is particularly suitable for performing image and colour space transformations, as well as binary classifier operations. The remaining processing units can be supported at the CPU 102. The processing units at the GPU might be defined by one or more modules (e.g. OpenCL modules) adapted to run on the typically highly parallel architecture of the GPU, with the processing units at the CPU being one or more software routines adapted for the particular architecture of the device at which the system is running (e.g. a RISC core).

In embodiments of the present invention in which the detector unit is supported at a GPU, the architecture of the face detection system allows efficient use of the typically many computing units provided in parallel in the GPU. As discussed above, the detector unit is configured to perform face detection within the search tiles provided to it and, in the present case, a different face detection thread is allocated to each subwindow within a search tile. Thus there can be many threads performing face detection in parallel on different subwindows. A GPU will typically operate in parallel on sets of threads referred to as wavefronts. Since some threads in a wavefront will terminate earlier than others and the wavefront comprising all the threads continues to run until all its threads terminate, this would mean that many computation units would be underutilized. A partial solution to this is to allocate new subwindows to existing threads of the wavefront that have completed. The wavefront can therefore be maintained until all of the subwindows of a search tile have been searched. To maximise utilization of the computing units it is preferable to search all possible subwindows within each search tile.

This can be achieved through the use of an index for each search tile that is atomically incremented each time a thread completes a subwindow. The index keeps track of which subwindows are yet to be allocated to a thread. When the index reaches the number of subwindows in the search tile no more work can be allocated to threads and the wavefront terminates.

The face detection system has been described in relation to its use in the camera pipeline of, for example, a digital camera, smartphone, tablet computer, or any other kind of device that includes a camera, such as a security camera. In alternative embodiments, the face detection system could receive frames from any suitable source, including from a storage subsystem providing a recorded video stream or a series of one or more digital images, and from a communication subsystem providing a received video stream or series of one or more digital images.

The present invention is not limited to being performed on streams of frames and the face detection system described herein also provides excellent performance when operated on a static image, such as a photograph. To perform face detection on a static image, that same image may be provided multiple times to the face detection system as source frame 103. In one example the image is provided twice, with the image first being used to determine skin colour, and then using that information to find faces in the second frame. In another example, the frame is provided more than twice, allowing the skin colour model to become refined in each subsequent iteration. Since each frame operated on by the system is identical to the previous frame, the system exhibits very good performance whilst continuing to provide the efficiency and flexibility benefits as discussed above.

Face detection as performed in accordance with the system described herein is useful in many types of devices. In particular, the locations of detected faces indicated at grouping unit 114 can be prioritized by the autofocus system of a camera pipeline as autofocus points with the aim of ensuring that the faces in an image are in focus. Detected face information can be used in video encoding apparatus to inform the encoder as to the location of faces in the video stream and permit the improvement of apparent quality of the encoded video by preferentially increasing the encode quality of the faces in the video stream. Detected face information can be provided as metadata for photographs captured by a camera so as to indicate the locations of faces in the photo.

None of the images or maps referred to herein need be maintained by the face detection system as data structures identifiable as an "image" or a "map". Any of the images and maps referred to (e.g. luma image 105, image pyramid 108, probability map 106, threshold map and SKN image 107) may be calculated in whole or in part from the source image 103 by the face detection system as and when those images/ maps (or parts of them) are required by functionalities of the system. The images and maps referred to herein might only exist as logical constructs in algorithms performed by the face detection system. Any face detections, transformations or conversions referred to herein may involve downscaling and other processing performed on the apparent subject image frame or may be performed on an image frame that has been downscaled or processed in any other way from the apparent subject image frame.

Data processing systems configured in accordance with the present invention could be embodied in hardware, software or any suitable combination of hardware and software. A data processing system of the present invention could comprise, for example, software for execution at one or more processors (such as at a CPU and/or GPU), and/or one or more dedicated processors (such as ASICs), and/or one or more programmable processors (such as FPGAs) suitably programmed so as to provide functionalities of the data processing system, and/or heterogeneous processors comprising one or more dedicated, programmable and general purpose processing functionalities. In preferred embodiments of the present invention, data processing systems comprise one or more processors and one or more memories having program code stored thereon, the data processors and the memories being such as to, in combination, provide the claimed data processing systems and/or perform the claimed methods.

Data processing units described herein (e.g. preprocessor 104, detector unit 109, grouping unit 114, tile generator 110, skin detection unit 112, and colour measurement unit 113) need not be provided as discrete units and represent functionalities that could (a) be combined in any manner, and (b) themselves comprise one or more data processing entities. Data processing units could be provided by any suitable hardware or software functionalities, or combinations of hardware and software functionalities, The term software as used herein includes executable code for processors (e.g. CPUs and/or GPUs), firmware, bytecode, programming language code such as C or OpenCL, and modules for reconfigurable logic devices such as FPGAs. Machine-readable code includes software and code for defining hardware, such as register transfer level (RTL) code as might be generated in Verilog or VHDL.

Any one or more of the data processing methods described herein could be performed by one or more physical processing units executing program code that causes the unit(s) to perform the data processing methods. The or each physical processing unit could be any suitable processor, such as a CPU or GPU (or a core thereof), or fixed function or programmable hardware. The program code could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A data processing system for performing face detection on a stream of frames of image data, the data processing system comprising:
   a face detector configured to detect a first face candidate in a first frame by performing face detection within first search tiles defined for the first frame;
   a colour measurement unit configured to calculate a set of colour parameters including an average colour of the first face candidate expressed according to a predefined colour space, one of the axes of the predefined colour space being substantially oriented in the direction of maximum variation according to a predetermined distribution of skin colour;
   a transformation unit configured to:
      transform a second frame into the predefined colour space; and
      form a skin colour probability map for the second frame by calculating the probability that a given colour is a skin colour from a measure of the colour space distance of that colour from the calculated average colour in the predefined colour space; and a search tile generator configured to generate a plurality of second search tiles based on the skin colour probability map for use by the face detector, the second search tiles defining areas of the second frame within which the face detector is to perform face detection so as to detect one or more second face candidates in the second frame.

2. A data processing system as claimed in claim 1, wherein the second frame is subsequent to the first frame in the stream of frames.

3. A data processing system as claimed in claim 1, wherein the colour measurement unit is further configured to calculate as colour parameters degrees of variation of colours in the first face candidate along the coordinate axes of the predefined colour space, and the transformation unit is configured to calculate the probability that a given colour is a skin colour from the measure of the colour space distance of that colour from the calculated average colour scaled by the calculated degrees of variation of colours.

4. A data processing system as claimed in claim 3, wherein the colour measurement unit is configured to calculate the average colour and degrees of variation of colours of the first face candidate from only a central portion of the first face candidate.

5. A data processing system as claimed in claim 3, wherein the set of colour parameters for the first face candidate represent an ellipsoid in the predefined colour space, the ellipsoid being centred on the average colour and having axes oriented parallel to the coordinate axes of the predefined colour space with lengths defined by the respective degree of variation in colours.

6. A data processing system as claimed in claim 1, wherein coordinate axes of the predefined colour space are determined by means of a principal component analysis of the predetermined distribution of skin colour.

7. A data processing system as claimed in claim 1, wherein the face detector is configured to detect faces in the first frame by applying binary classifiers to subwindows of the first search tiles, and to group together sets of overlapping subwindows detected as faces in the first frame so as to form a single face candidate for each set, each face candidate being allocated a weight according to the number of overlapping subwindows in its set and the first face candidate being the face candidate with the highest weight.

8. A data processing system as claimed in claim 7, wherein the transformation unit is configured to maintain a plurality of sets of colour parameters calculated for a plurality of face candidates from one or more frames prior to the second frame in the stream, each set of colour parameters inheriting the weight allocated to the respective face candidate and the set of colour parameters used by the transformation unit being the set of colour parameters with the highest weight.

9. A data processing system as claimed in claim 8, wherein the colour measurement unit is operable to calculate a new set of colour parameters for a new face candidate, the transformation unit being configured to, if an ellipsoid for the new set overlaps an ellipsoid represented by a currently stored set of colour parameters by more than a predetermined degree, update the existing set of colour parameters by replacing the existing set of colour parameters with the new set of colour parameters and forming a new weight by combining the weights of the existing and new set of colour parameters.

10. A data processing system as claimed in claim 1, wherein the face detector and transformation unit are supported at a GPU.

11. A data processing system as claimed in claim 1, wherein the colour measurement unit and search tile generator are supported at a CPU.

12. A data processing system as claimed in claim 1, wherein the first and second frame both represent a single image, the first and second frames optionally being identical.

13. A method of performing face detection on a stream of frames of image data using a data processing system, the method comprising:
   detecting a first face candidate in a first frame of the stream by performing face detection within first search tiles defined for the first frame;
   calculating a set of colour parameters including an average colour of the first face candidate expressed according to a predefined colour space, one of the axes of the predefined colour space being substantially oriented in the direction of maximum variation according to a predetermined distribution of skin colour;
   transforming a second frame of the stream into the predefined colour space;
   forming a skin colour probability map for the second frame by calculating the probability that a given colour is a skin colour from a measure of the colour space distance of that colour from the calculated average colour in the predetermined colour space;
   generating a plurality of second search tiles based on the skin colour probability map; and
   detecting one or more second face candidates in the second frame by performing face detection within the second search tiles.

14. A non-transitory computer readable storage medium having stored thereon processor-executable code, which when executed causes a processor to generate a data processing system comprising:
   a face detector configured to detect a first face candidate in a first frame by performing face detection within first search tiles defined for the first frame;
   a colour measurement unit configured to calculate a set of colour parameters including an average colour of the first face candidate expressed according to a predefined colour space, one of the axes of the predefined colour space being substantially oriented in the direction of maximum variation according to a predetermined distribution of skin colour;
   a transformation unit configured to:
      transform a second frame into the predefined colour space; and
      form a skin colour probability map for the second frame by calculating the probability that a given colour is a skin colour from a measure of the colour space distance of that colour from the calculated average colour in the predefined colour space; and
   a search tile generator configured to generate a plurality of second search tiles based on the skin colour probability map for use by the face detector, the second search tiles defining areas of the second frame within which the face detector is to perform face detection so as to detect one or more second face candidates in the second frame.

* * * * *